United States Patent [19]

Takai et al.

[11] Patent Number: 4,942,106
[45] Date of Patent: Jul. 17, 1990

[54] ELECTROPHOTOGRAPHIC PHOTOSENSITIVE MEMBER CONTAINING DISAZO PIGMENT HAVING COUPLER RESIDUE

[75] Inventors: Hideyuki Takai, Yokohama; Tetsuro Kanemaru, Tokyo, both of Japan

[73] Assignee: Canon Kabushiki Kaisha, Tokyo, Japan

[21] Appl. No.: 291,738

[22] Filed: Dec. 29, 1988

[30] Foreign Application Priority Data

Dec. 30, 1987 [JP] Japan ................................ 62-335783

[51] Int. Cl.$^5$ .............................................. G03G 5/06
[52] U.S. Cl. ......................................... 430/72; 430/57
[58] Field of Search .............................. 430/76, 72, 57

[56] References Cited

U.S. PATENT DOCUMENTS 4,495,264  1/1985  Takahashi ..................... 430/72 X
4,822,704  4/1989  Akasaki ........................ 430/72 X

FOREIGN PATENT DOCUMENTS

58-194035  11/1983  Japan .
61-219048   9/1986  Japan .

Primary Examiner—J. David Welsh
Attorney, Agent, or Firm—Fitzpatrick, Cella, Harper & Scinto

[57] ABSTRACT

An electrophotographic photosensitive member has a photosensitive layer on an electroconductive support, characterized in that said photosensitive layer contains a disazo pigment of the formula (1), wherein $A_1$ and $A_2$, which may be either the same or different, each represent a coupler residue having a phenolic hydroxyl group.

8 Claims, 1 Drawing Sheet

F I G. 1

ELECTROPHOTOGRAPHIC PHOTOSENSITIVE MEMBER CONTAINING DISAZO PIGMENT HAVING COUPLER RESIDUE

BACKGROUND OF THE INVENTION

1. Field of the Invention

This invention relates to an electrophotographic photosensitive member, more particularly to an electrophotographic photosensitive member containing a disazo pigment having a specific molecular structure in the photosensitive layer.

2. Related Background Art

In the prior art, as the electrophotographic photosensitive member by use of an inorganic photoconductive substance, those using selenium, cadmium sulfide, zinc oxide, etc. have been widely known.

On the other hand, as the electrophotographic photosensitive member by use of an organic photoconductive substance, those using a photoconductive polymer as represented by poly-N-vinylcarbazole or a low molecular weight organic photoconductive substance such as 2,5-bis(p-diethylaminophenyl)-1,3,4-oxadiazole and further a combination of such organic photoconductive substance with various dyes or pigments have been known.

The electrophotographic photosensitive member by use of an organic photoconductive substance has such advantages that film forming property is good, and that it can be produced by coating with extremely high productivity to provide photosensitive members at low cost. Also, it has the advantage that by selection of the sensitizer to be used such as dye or pigment, color sensitivity can be controlled freely, and has been heretofore widely investigated. Particularly, in recent years, by development of the function separation type photosensitive member comprising a layer containing an organic photoconductive pigment as the charge generation layer and a layer containing a photoconductive polymer or a low molecular weight organic photoconductive substance as mentioned above as the charge transport layer laminated on one another, remarkable improvements have been done to sensitivity and durability which have been the drawbacks of the organic electrophotographic photosensitive member of the prior art, to make it possible to provide the photosensitive member for practical application.

As the disazo pigment to be used in this kind of photosensitive member, for example, dicyanofluorenylidene type disazo pigments as disclosed in Japanese Laid-open Patent Publication No. 58-194035 benzanthrone type disazo pigments as disclosed in Japanese Laid-open Patent Publication No. 61-219048 have been known. However, the photosensitive member by use of these disazo pigments proved to be not satisfactory with respect to sensitivity and potential stability when used repeatedly.

SUMMARY OF THE INVENTION

An object of the present invention is to provide a novel photoconductive material.

It is also another object of the present invention to provide an electrophotographic photosensitive member having practical high sensitivity characteristic and stable potential characteristic when used repeatedly.

Therefore, according to the present invention, there is provided an electrophotographic photosensitive member comprising a photosensitive layer on an electroconductive support, characterized in that said photosensitive layer contains a disazo pigment of the formula:

(1)

wherein $A_1$ and $A_2$, which may be either the same or different, each represent a coupler residue having a phenolic hydroxyl group.

DETAILED DESCRIPTION OF THE INVENTION

The disazo pigment of the present invention may be estimated to improve overlapping between the pigment molecules by good planarity of the center diamine component, which enhances charge generation ability, and also improves injectability into the charge transport substance by strengthening of the acceptor characteristic by dicyanomethylene group, thereby bringing about good actions on sensitivity and potential fluctuation.

In the present invention, more preferable specific examples of the coupler residue having phenolic hydroxyl group represented by $A_1$ and $A_2$ may include the residues represented by the following formulae (2) to (6).

Formula:

(2)

wherein, X represents a residue necessary for forming a polycyclic aromatic ring or heterocyclic ring by fusion with benzene ring such as naphthalene ring, anthracene ring, carbazole ring, benzcarbazole ring, dibenzcarbazole ring, dibenzofuran ring, dibenzonaphtofuran ring, diphenylenesulfite ring, fluorenone ring, etc.

The ring to which X is attached should be more preferably made naphthalene ring, anthracene ring, carbazole ring, benzcarbazole ring.

$R_1$ and $R_2$ each represent hydrogen atom, an alkyl, aryl, aralkyl, heterocyclic group or cyclic amino group containing the nitrogen atom within ring to which $R_1$, $R_2$ are attached.

Specifically, as the alkyl group, groups such as methyl ethyl, propyl, butyl and the like may be included; as the aralkyl group, groups such as benzyl, phenethyl, naphthylmethyl and the like; as the aryl group, groups such as phenyl, diphenyl, naphthyl, anthryl and the like; as the heterocyclic group, groups such as carbazole, dibenzofuran, benzimidazolone, benzthiazole, thiazole, pyridine, etc.

Z represents oxygen atom or sulfur atom.

n represents an integer of 0 to 1.

Formula:

(3)

wherein $R_3$ represents hydrogen atom, an alkyl, aryl or aralkyl group which may have substituent. Specific examples of $R_3$ may be shown by the same examples for $R_1$ and $R_2$ as described above.

Further, examples of the substituent on the alkyl, aryl, aralkyl heterocyclic groups shown by the substituents $R_1$ to $R_3$ in the formulae (2) to (3) may include halogen atoms such as fluorine, chlorine, iodine, bromine atoms, alkyl groups such as methyl, ethyl, propyl, isopropyl, butyl and the like, alkoxy groups such as methoxy, ethoxy, propoxy, phenoxy and the like, nitro group, cyano group, substituted amino groups such as dimethylamino, dibenzylamino, diphenylamino, morpholino, piperidino, pyrrolidino and the like.

Formula:

(4)

wherein Y represents a divalent aromatic hydrocarbon group or a divalent heterocyclic group containing nitrogen atom within the ring. As the divalent aromatic hydrocarbon group, divalent group of monocyclic aromatic hydrocarbon such as o-phenylene, divalent fused polycyclic aromatic hydrocarbon group such as o-naphthylene, perinaphthylene, 1,2-anthrylene, 9,10-phenanthrylene, etc. may be included. As the divalent heterocyclic group containing nitrogen atom within the ring, divalent groups such as 3,4-pyrazolediyl group, 2,3-pyridinediyl group, 4,5-pyrimidinediyl group, 6,7-indazolediyl group, 6,7-quinolinediyl group, etc. may be included.

Formula:

(5)

wherein $R_4$ represents an aryl group or heterocyclic group which may have substituent. Specifically as the aryl group, groups such as phenyl, naphthyl, anthryl, pyrenyl, etc. may be included and as the heterocyclic group, groups such as pyridyl, thienyl, furyl, carbazoyl etc.

Further, as the substituent on the aryl group, heterocyclic group, there may be included halogen atoms such as fluorine, chlorine, iodine, bromine atoms, alkyl groups such as methyl, ethyl, propyl, isopropyl, butyl and the like, alkoxy groups such as methoxy, ethoxy, propoxy, phenoxy and the like, nitro group, cyano group, substituted amino groups such as dimethylamino, dibenzylamino, diphenylamino, morpholino, piperidino, pyrrolidino and the like.

X is the same as X in the above formula (2).

Formula:

(6)

wherein $R_5$ and $R_6$ each represent an alkyl, aralkyl, aryl or heterocyclic group which may have substituent, specifically groups such as methyl, ethyl, propyl, butyl and the like as the alkyl group; groups such as benzyl, phenethyl, naphthylmethyl and the like as the aralkyl group; groups such as phenyl, diphenyl, naphthyl, anthryl and the like as the aryl group; groups such as carbazolyl, thienyl, pyridyl, furyl and the like as the heterocyclic group. Further, as the substituent on the alkyl group, aralkyl group, aryl group, heterocyclic group, there may be included halogen atoms such as fluorine, chlorine, iodine, bromine atoms, alkyl groups such as methyl, ethyl, propyl, isopropyl, butyl and the like, alkoxy groups such as methoxy, ethoxy, propoxy, phenoxy and the like, nitro group, cyano group, substituted amino groups such as dimethylamino, dibenzylamino, diphenylamino, morpholino, piperidino, pyrrolidino and the like.

X is the same as X in the above formula (2).

In the following, representative specific examples of the disazo pigment represented by the formula (1) are enumerated.

The exemplary pigments represent the specific structures by writing only $A_1$ and $A_2$ which are different portions in the basic structure.

Basic structure:

-continued

Exemplary pigment (11)

$A_1, A_2$:

Exemplary pigment (12)

$A_1, A_2$:

Exemplary pigment (13)

$A_1, A_2$:

Exemplary pigment (14)

$A_1, A_2$:

Exemplary pigment (15)

$A_1, A_2$:

Exemplary pigment (16)

-continued

Exemplary pigment (17)

$A_1, A_2$:

Exemplary pigment (18)

$A_1, A_2$:

Exemplary pigment (19)

$A_1, A_2$:

Exemplary pigment (20)

$A_1, A_2$:

-continued

Exemplary pigment (29)

A₁, A₂:

Exemplary pigment (30)

A₁, A₂:

Exemplary pigment (31)

A₁, A₂:

Exemplary pigment (32)

A₁, A₂:

-continued

Exemplary pigment (33)

A₁:

A₂:

Exemplary pigment (34)

A₁:

A₂:

Exemplary pigment (35)

A₁:

Exemplary pigment (36)

The disazo pigment represented by the formula (1) is not limited to the above disazo pigments.

The disazo pigment represented by the formula (1) can be easily synthesized by tetrazoitizing the corresponding diamine in the usual way, and coupling the product with the corresponding coupler in the presence of an alkali or converting the tetrazonium salt into borofluoride salt or zinc chloride complex salt and the like and then coupling the salt with the corresponding coupler in a solvent such as N,N-dimethylamide, dimethyl sulfoxide, etc. in the presence of a base such as sodium acetate, pyridine, triethylamine, triethanolamine, etc.

When $A_1$ and $A_2$ are different, it can be synthesized by subjecting the tetrazonium salt as described above and the first coupler to coupling, followed by coupling of the second coupler, or alternatively by protecting one of the amino groups of the diamine with acetyl group, etc., diazotizing the protected compound and subjecting to coupling with the first coupler, then hydrolizing the protective group such as acetyl group, etc. with hydrochloric acid, etc. and again diazotizing the hydrolized product, followed by coupling of the second coupler. Synthesis example (synthesis of the exemplary pigment (3))

Into a 300 ml beaker were charged 150 ml of water, 20 ml (0.23 mol) of conc. hydrochloric acid and 10.0 g (0.032 mol) of:

and the mixture was cooled to 0° C., into which was added dropwise a solution of 4.6 g (0.067 mol) of sodium sulfite dissolved in 10 ml of water over 10 minutes while controlling the liquid temperature at 5° C. or lower. After completion of the dropwise addition, the mixture was stirred for 15 minutes, and carbon was added, followed by filtration. Into the tetrazotized solution obtained was added dropwise a solution of 10.5 g (0.096 mol) of sodium borofluoride dissolved in 40 ml of water, and the precipitated borofluoride salt was filtered, washed with cold water and then with acetonitrile, followed by drying at room temperature under reduced pressure.

Yield: 12.1 g, Yield: 74.7%

Next, 500 ml of DMF was charged into one liter beaker, and 12.4 g (0.042 mol) of:

was dissolved therein. After the liquid temperature was cooled to 5° C., 10.0 g (0.020 mol) of the borofluoride salt was dissolved in the solution, and then 5.1 g (0.050 mol) of triethylamine was added over 5 minutes. After the dropwise addition, the mixture was stirred for 2 hours, the pigment precipitated was filtered, washed for 4 times with DMF, then with water and replaced with acetone, followed by drying at room temperature under reduced pressure.

Yield: 15.9 g, Yield 86%, m.p, 300° C. or higher (decompd.)

| Elemental analysis: | Calcd. (%) | Found (%) |
|---|---|---|
| C | 70.04 | 69.98 |
| H | 3.27 | 3.38 |
| N | 12.10 | 12.26 |

The coating having the disazo pigment as described above exhibits photoconductivity and therefore can be used for the photosensitive layer of an electrophotographic photosensitive member as described below.

Thus, in the specific example of the present invention, an electrophotographic photosensitive member can be prepared by forming a coating by incorporating by dispersion the disazo pigment as described above in an appropriate binder.

Figure 1:
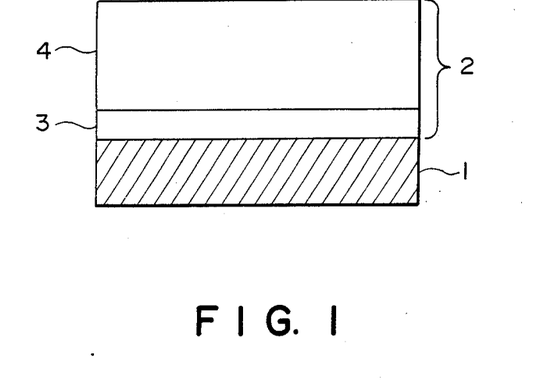
FIG. 1 illustrates schematically the layer constitution of the electrophotographic photosensitive member of the present invention.

According to a preferred specific example of the electrophotographic photosensitive member of the present invention, as shown in FIG. 1, it is the function separation type wherein the photosensitive layer 2 provided on the electroconductive support 1 has a laminated structure of the charge generation layer 3 and the charge transport layer 4, and the disazo pigment as described above is used as the charge generation substance to be contained in the charge generation layer 3.

The charge generation layer, in order to obtain sufficient absorbance, should preferably contain the disazo pigment exhibiting photoconductivity as described above in an amount as much as possible and be made a thin film layer having, for example, a thickness of 5 μm or less, preferably 0.01 to 1 μm for shortening the flight distance of the charge carriers generated.

This is due to the fact that most of the incident rays are absorbed in the charge generation layer to form much charge carriers, and further that the carriers generated are required to be injected into the charge transport layer without deactivation by recombination or trapping.

The charge generation layer can be formed by dispersing the above disazo pigment in an appropriate binder and coating the dispersion on an appropriate electroconductive support, and the available binder can be selected from a wide scope of insulating resins, and also from organic photoconductive polymers such as poly-N-vinylcarbazole, polyvinylanthracene, polyvinylpyrene, etc.

Preferably, there may be employed insulating resins such as polyvinyl butyral, polyarylate (polycondensate of bisphenol A and phthalic acid, etc.) polycarbonate, polyester, phenoxy resin, polyvinyl acetate, acrylic resin, polyacrylamide, polyamide, polyvinylpyridine, cellulosic resins, polyurethane, epoxy resin, casein, polyvinyl alcohol, polyvinyl pyrrolidone, etc.

The resin to be contained in the charge generation layer may be suitably 80% by weight or less, preferably 40% by weight or less.

The solvent for solving these resins depends on the kind of the resin, and should be preferably selected from those which will not dissolve the charge transport layer and the subbing layer as described below.

Specific examples of organic solvents may include alcohols such as methanol, ethanol, propanol and the like; ketones such as acetone, methyl ethyl ketone, cyclohexanone and the like; amides such as N,N-dimethylformamide, N,N-dimethylacetamide and the like; sulfoxides such as dimethyl sulfoxide and the like; ethers such as tetrahydrofuran, dioxane, ethyleneglycol monomethyl ether and the like; esters such as methyl acetate, ethyl acetate and the like; aliphatic halogenated hydrocarbons such as chloroform, methylene chloride, dichloroethylene, carbon tetrachloride, trichloroethylene and the like; or aromatic hydrocarbons such as benzene, toluene, xylene, rigroin, monochlorobenzene, dichlorobenzene and the like.

Coating can be practiced by use of such coating methods as dip coating, spray coating, spinner coating, bead coating, Myer bar coating, blade coating, roller coating, curtain roll coating, etc.

Drying should be preferably conducted by finger touch drying at room temperature, followed by heating drying. Heating drying can be practiced at a temperature of 30° to 200° C. for a time within the range of 5 minutes to 2 hours, either stationarily or under air stream.

The charge transport layer is electrically connected to the charge generation layer as described above, and has the function capable of receiving the charge carriers injected from the charge generation layer and also transporting these carriers to the surface under the presence of an electrical field. The charge transport layer may be laminated on the charge generation layer 3 as shown in FIG. 1, or alternatively laminated beneath the charge generation layer 3.

The charge transport substance to be contained in the charge transport layer includes electron transportable substances and positive hole transportable substances, and examples of electron transportable substances include electron attracting substances such as chloroanil, bromoanil, tetracyanoethylene, tetracyanoquinodimethane, 2,4,7-trinitro-9-fluorenone, 2,4,5,7-tetranitro-9-fluorenone, 2,4,7-trinitro-9-dicyanomethylenefluorenone, 2,4,5,7-tetranitroxanthone, 2,4,8-trinitrothioxanthone, etc. and polymers formed from these electron attracting substances.

Examples of positive hole transportable substances may include hydrazone type compounds such as N-methyl-N-phenylhydrazino-3-methylidene-9-ethylcarbazole, N,N-diphenylhydrazino-3-methylidene-9-ethylcarbazole, N,N-diphenylhydrazino-3-methylidene-10-ethylphenothizine, N,N-diphenylhydrazino-3-methylidene-10-ethylphenoxazine, p-diethylaminobenzaldehyde-N,N-diphenylhydrazone, p-diethylaminobenzaldehyde-N-α-naphthyl-N-phenylhydrazone, p-pyrrolidinobenzaldehyde-N,N-diphenylhydrazone, 1,3,3-trimethylindolenine-ω-aldehyde-N,N-diphenylhydrazone, p-diethylbenzaldehyde-3-methylbenzthiazolinone-2-hydrazone and the like; pyrazoline type compound such as 1-[pyridyl(2)]-3-(α-methyl-p-diethylaminostyryl)-5-(p-diethylaminophenyl)pyrazoline, 1-phenyl-3-(p-diethylaminostyryl)-4-methyl-5-(p-diethylaminophenyl)pyrazoline, 1-phenyl-3-(α-benzyl-p-diethylaminostyryl)-5-(p-diethylaminophenyl)pyrazoine, spiropyrazoine and the like; styryl type compounds such as α-phenyl-4-N,N-diphenylaminostilbene, N-ethyl-3-(α-phenylstyryl)carbazole, 9-dibenzylaminobenzylidene-9H-fluorenone, 5-p-ditolylaminobenzylidene-5H-dibenzo[a,d]cycloheptene and the like; oxazole type compounds such as 2-(p-diethylaminostyryl)-6-diethylaminobenzoxazole, 2-(p-diethylaminophenyl)-4-(p-dimethylaminophenyl)-5-(2-chlorophenyl)oxazole and the like; thiazole type compounds such as 2-(p-diethylaminostyryl)-6-diethylaminobenzothiazole and the like; triarylmethane type compounds such as bis(4-diethylamino-2-methylphenyl)-phenylmethane and the like; polyarylalkane type compounds such as 1,1-bis(4-N,N-diethylamino-2-methylphenyl)heptane, 1,1,2,2-tetrakis(4-N,N-dimethylamino-2-methylphenyl)ethane and the like; triphenylamine, poly-N-vinylcarbazole, polyvinylpyrene, polyvinylanthracene, polyvinylacridine, poly-9-vinylphenylanthracene, pyreneformaldehyde resin, ethylcarbazole-formaldehyde resin, etc.

In addition to these organic charge transport substances, inorganic materials such as selenium, selenium-tellurium, amorphous silicon, cadmium sulfide, etc. can be also used.

Also, these charge transport substance can be used either singly or as a combination of two or more kinds.

When the charge transport substance has no film forming property, coating can be formed by selecting a suitable binder. The resin available as the binder may include, for example, insulating resins such as acrylic resin, polyarylate, polyester, polycarbonate, polystyrene, acrylonitrile-styrene copolymer, acrylonitrile-butadiene copolymer, polyvinyl butyral polyvinyl formal, polysulfone, polyacrylamide, polyamide, chlorinated rubber, etc., or organic photoconductive polymers such as poly-N-vinylcarbazole, polyvinylanthracene, polyvinylpyrene, etc.

The charge transport layer is limited in transporting the charge carriers, and therefore it cannot be made thicker than is necessary. Generally, the thickness may be 5 to 30 μm, but preferably 8 to 20 μm. In forming the charge transport layer by coating, a suitable coating method as mentioned above can be employed.

The photosensitive layer comprising a laminated structure of such charge generation layer and charge transport layer is provided on an electroconductive support. As the electroconductive support. a support which itself has electroconductivity, for example, aluminum, aluminum alloy, copper, zinc, stainless steel, vanadium, molybdenum, chromium, titanium, nickel, indium, gold, platinum, etc. may be employed.

Otherwise, there can be employed a plastic (e.g. polyethylene, polypropylene, polyvinyl chloride, polyethyleneterephthalate, acrylic resin, polyfluoroethylene, etc.) having a layer of aluminum, aluminum alloy, indium oxide, tin oxide, indium oxide-tin oxide alloy, etc. formed thereon by the vacuum vapor deposition method, a support comprising electroconductive particles (e.g. carbon black, silver particles) together with a suitable binder coated on a plastic or the above support, a support comprising a plastic or paper impregnated with electroconductive particles, or a plastic having an electroconductive polymer, etc.

It is also possible to provide a subbing layer having barrier function or adhesion function between the electroconductive support and the photosensitive layer.

The subbing layer can be formed of casein, polyvinyl alcohol, nitrocellulose, ethylene-acrylic acid copolymer, polyamide (nylon 6, nylon 66, nylon 610, copolymerized nylon, alkoxymethylated nylon, etc.), polyurethane, gelatin, aluminum oxide. etc.

The subbing layer may have a film thickness suitably of 0.1 to 5 μm, preferably 0.5 to 3 μm.

According to another embodiment of the present invention, a photosensitive coating can be made, which contains the disazo pigment of the above formula (1) as the sensitizer for organic photoconductive substances such as hydrazone type compounds, pyrazoline type compounds styryl type compounds, oxazole type compounds, thiazole type compounds, triarylmethane compounds, polyarylalkane type compounds, triphenylamine, poly-N-vinylcarbazole, etc. or inorganic photoconductive substances such as zinc oxide, cadmium sulfide, selenium. etc. Such photosensitive coating can be formed by coating of these photoconductive substances and the above disazo pigment together with a binder.

As still another embodiment of the present invention, an electrophotographic photosensitive member containing the disazo pigment of the above formula (1) together with a charge transport substance in the same layer may be mentioned. In this case, in addition to the charge transport substance as mentioned above, charge transfer complex compounds comprising poly-N-vinylcarbazole and trinitrofluorenone can be employed.

The electrophotographic photosensitive member of this embodiment can be prepared by forming a coating after dispersing the above disazo pigment and the charge transfer complex compounds in a solution of a polyester solution dissolved in tetrahydrofuran.

In any electrophotographic photosensitive member, the pigment used contains at least one pigment selected from the disazo piqments represented by the formula (1), and its crystal form may be either amorphous or crystalline.

It is also possible to use, if desired, pigments with different light absorption in combination for enhancing sensitivity of the photosensitive member, to combine two or more kinds of the disazo pigments represented by the formula (1) for the purpose of obtaining a panchromatic photosensitive member, or to use the disazo pigment in combination with a charge generation substance selected from known dyes, pigments.

The electrophotographic photosensitive member can be utilized not only for electrophotographic copying machine, but also widely used in the applied field of electronic photography such as laser beam printer, CRT printer, LED printer, liquid crystal printer, laser printmaking, etc.

EXAMPLES 1–28

On an aluminum plate was coated an aqueous ammonia solution of casein (casein 11.2 g, ammonia water 1 g, water 222 ml) by a Myer bar to a film thickness of 1.0 μm after drying, and then the coating was dried.

Next, 5 g of the exemplary pigment (1) was added into a solution of 2 g of a butyral resin (butyral formation degree: 63 mol %) dissolved in 95 ml of cyclohexanone, and the mixture was dispersed in a sand mill for 20 hours. The dispersion coated by a Myer bar and dried on the casein layer previously formed to a film thickness of 0.5 μm after drying to form a charge generation layer.

Next, 5 g of a hydrazone compound of the following formula as the charge transport substance:

and 5 g of a polymethyl methacrylate (number-average molecular weight: 100,000) were dissolved in 40 ml of benzene, and the solution was coated by a Myer bar and dried on the charge generation layer to a film thickness of 20 μm after drying to form a charge transport layer, thus preparing an electrophotographic photosensitive member of Example 1.

By use of other exemplary compounds in place of the exemplary pigment (1), photosensitive members corresponding to Examples 2 to 28 were prepared in entirely the same manner.

Each of the electrophotographic photosensitive members thus prepared was subjected to corona charging by means of an electrophotographic copying paper testing device (Model SP-428, produced by Kawaguchi Denki K.K.) according to the static system at −5 KV, maintained in a dark place for one second and then exposed at a luminance of 10 lux for examination of the charging characteristics.

As the charging charactaeristics, the surface potential (Vo) and the exposure dosage (E½) necessary for attenuating the potential to ½ when subjected to dark decay for one second were measured. The results are shown below:

Disazo pigment: (Comparative example 1)

Vo: −710 V
E½: 4.5 lux · sec

Disazo pigment: (Comparative example 2)

Vo: −660 V
E½: 4.1 lux · sec

| Example | Exemplary pigment | Vo (-V) | E½ (lux.sec) |
|---|---|---|---|
| 1 | (1) | 680 | 3.5 |
| 2 | (2) | 700 | 3.8 |
| 3 | (3) | 690 | 2.2 |
| 4 | (4) | 680 | 2.3 |
| 5 | (5) | 710 | 2.8 |
| 6 | (7) | 700 | 3.3 |
| 7 | (9) | 720 | 4.1 |
| 8 | (10) | 700 | 3.7 |
| 9 | (11) | 690 | 2.0 |
| 10 | (12) | 695 | 2.5 |
| 11 | (13) | 690 | 2.6 |
| 12 | (14) | 720 | 3.0 |
| 13 | (16) | 680 | 2.5 |
| 14 | (17) | 680 | 4.4 |
| 15 | (20) | 685 | 2.3 |
| 16 | (21) | 690 | 1.8 |
| 17 | (22) | 700 | 2.3 |
| 18 | (23) | 705 | 2.6 |
| 19 | (24) | 710 | 3.0 |
| 20 | (25) | 680 | 2.4 |
| 21 | (26) | 690 | 2.8 |
| 22 | (27) | 690 | 3.2 |
| 23 | (28) | 700 | 2.2 |
| 24 | (29) | 695 | 2.4 |
| 25 | (32) | 700 | 3.4 |
| 26 | (33) | 705 | 2.1 |
| 27 | (35) | 685 | 2.0 |
| 28 | (36) | 710 | 2.8 |

COMPARATIVE EXAMPLES 1-2

Photosensitive members corresponding to Comparative examples 1, 2 were prepared in entirely the same manner as in Example 3 except for using the disazo pigments of the formulae shown below in place of the disazo pigment in Example 3, and the charging characteristics were examined in the same manner. The results are shown below.

From Example 3 and the above Comparative examples, it can be appreciated that the disazo pigment used in the present invention has very excellent sensitivity.

EXAMPLES 29-33

By use of the photosensitive members used in Examples 3, 6, 11, 16, 23, fluctuations in light portion potential and dark portion potential during repeated uses were measured.

As the method, the above photosensitive member was plastered on a cylinder of an electrophotographic copying machine equipped with a −5.6 KV corona charger, an exposure optical system, a developing means, a transfer charger, a deelectrifying exposure optical system and a cleaner. The copying machine had a constitution such that an image was obtained on a transfer paper with driving of the cylinder. By use of the copying machine, the initial light portion potential ($V_L$) and dark portion potential ($V_D$) were set respectively at around −200 V and −700 V, and the fluctuated amount $\Delta V_L$ and $\Delta V_D$ of the light portion potential ($V_L$) and the light portion potential ($V_D$) after use of 5,000 times were measured. The results are shown below.

The negative symbols in $\Delta V_D$, $\Delta V_L$ indicate lowering in potential and the positive symbols elevation of potential.

| Example | Photosensitive member | $\Delta V_D$ (V) | $\Delta V_L$ (V) |
|---|---|---|---|
| 29 | 3 | 0 | +10 |
| 30 | 6 | −5 | +15 |
| 31 | 11 | +5 | +5 |
| 32 | 16 | −20 | +10 |
| 33 | 23 | −15 | +20 |

COMPARATIVE EXAMPLES 3-4

For the photosensitive members used in Comparative examples 1, 2, potential fluctuations during repeated uses were measured according to the same method as in Example 29. The results are shown below.

| Comparative example | Photosensitive member | $\Delta V_D$ (V) | $\Delta V_L$ (V) |
|---|---|---|---|
| 3 | 1 | +50 | +80 |
| 4 | 2 | −30 | +65 |

From the above results, it can be appreciated that the electrophotographic member of the present invention is little in potential fluctuation during repeated use.

EXAMPLE 34

On the aluminum surface of an aluminum vapor-deposited polyethylene terephthalate film was formed a coating of a polyvinyl alcohol with a film thickness of 0.5 μm.

Next, a dispersion of the disazo pigment used in Example 3 was coated by a Myer bar and dried on the polyvinyl alcohol layer previously formed to a film thickness after drying of 0.2 μm to form a charge generation layer.

Next, a solution of 5 g of a styryl compound of the following formula:

as the charge transport substance and 5 g of a polyarylate (polycondensate of bisphenol A and terephthalic acid - isophthalic acid) dissolved in 40 ml of tetrahydrofuran was coated and dried on the charge generation layer to a film thickness of 18 μm after drying to form a charge transport layer.

The charging characteristics and durability characteristics of the electrophotographic photosensitive member thus prepared were measured according to the same methods as in Example 1 and Example 29. The results are shown below.

Vo: −690 V
E½: 1.6 lux·sec
$\Delta V_D$: −10 V
$\Delta V_L$: +5 V

EXAMPLE 35

A photosensitive member coated with the charge transport layer and the charge generation layer of the photosensitive member prepared in Example 3 in the reversed order, and the charging characteristics were evaluated similarly as in Example 1.

Vo: +720 V
E½: 2.2 lux·sec

EXAMPLES 36-39

The photosensitive members prepared in Examples 15, 16, 20 and 24 were exposed by use of a semiconductor laser having an oscillated wavelength at 780 nm, and sensitivity at 780 nm was examined. The results are shown below.

| Example | Photosensitive member (Example) | E½ (μJ/cm²) |
|---|---|---|
| 36 | 15 | 1.5 |
| 37 | 16 | 1.0 |
| 38 | 20 | 1.3 |
| 39 | 24 | 0.9 |

EXAMPLE 40

On the charge generation layer prepared in Example 1 a coating solution prepared by dissolving 5 g of 2,4,7-trinitro-9-fluorenone and 5 g of a poly-4,4'-dioxydiphenyl-2,2-propanecarbonate (molecular weight 300,000) in 70 ml of monochlorobenzene was coated and dried to a coated amount after drying of 12 g/m².

The electrophotographic photosensitive member thus prepared was subjected to measurement of the charging characteristics according to the same method as in Example 1. However, the charging polarity was made +. The results are shown below.

Vo: +680 V
E½: 4.5 lux·sec

EXAMPLE 41

On an aluminum plate with a thickness of 100 μm was coated an aqueous ammonia solution of casein (as described above), followed by drying, to form a subbing layer with a thickness of 0.5 μm.

Next, 5 g of 2,4,7-trinitro-9-fluorenone and 5 g of a poly-N-vinylcarbazole (number-average molecular weight 300,000) were dissolved in 70 ml of tetrahydrofuran to prepare a charge transfer complex compound.

The charge transfer complex compound and 1 g of the exemplary pigment (2) were added into a solution of 5 g of a polyester (trade name: Vyron, produced by Toyobo Co.. Ltd.) to be dispersed therein. The dispersion was coated and dried on the subbing layer to form a layer of 16 μm, thus preparing a photosensitive member.

The charging characteristics of the electrophotographic photosensitive member thus prepared were measured according to the same method as in Example 1. However, the charging polarity was made +. The results are shown below.

Vo: +650 V
E½: 4.2 lux·sec
What is claimed is:

1. An electrophotographic photosensitive member comprising a photosensitive layer on an electroconductive support, characterized in that said photosensitive layer contains a disazo pigment of the formula:

(wherein $A_1$ and $A_2$, which may be either the same or different, each represent a coupler residue having a phenolic hydroxyl group).

2. An electrophotographic photosensitive member according to claim 1, wherein said photosensitive layer contains a charge transport substance.

3. An electrophotographic photosensitive member according to claim 1, wherein said photosensitive layer contains a charge transport substance selected from the group consisting of hydrazone type compounds, pyrazoline type compounds, styryl type compounds, oxazole type compounds, thiazole type compounds, triarylmethane type compounds and polyarylalkane type compounds.

4. An electrophotographic photosensitive member according to claim 1, wherein said photosensitive layer contains the disazo pigment of the above formula (1) under the state dispersed in a binder.

5. An electrophotographic photosensitive member according to claim 2, wherein said photosensitive layer has a laminated structure of a charge generation layer containing the disazo pigment of the above formula (1) and a charge transport layer containing a charge transport substance.

6. An electrophotographic photosensitive member according to claim 5, wherein the charge transport layer is laminated on the charge generation layer.

7. An electrophotographic photosensitive member according to claim 5, wherein the charge generation layer is laminated on the charge transport layer.

8. An electrophotographic photosensitive member according to claim 1, wherein $A_1$ and $A_2$ in the disazo pigment of the above formula (1) are residues represented by the formulae (2) to (6) shown below:

Formula (2)

Formula (3)

Formula (4)

Formula (5)

Formula (6)

wherein $R_1$ and $R_2$ each represent hydrogen atom, an alkyl, aryl, aralkyl or heterocyclic group which may have substituent, or $R_1$ and $R_2$ may be bonded to represent a cyclic amino group containing nitrogen atom within the ring; $R_3$ represents hydrogen atom, an alkyl, aryl or aralkyl group which may have substituent; $R_4$ represents an aryl or heterocyclic group which may have substituent; $R_5$ and $R_6$ each represent an alkyl, aryl, aralkyl or heterocyclic group which may have substituent; X represents a residue necessary for forming a polycyclic aromatic ring or a hetero ring by fusion with benzene ring; Y represents a divalent aromatic hydrocarbon group or a divalent heterocyclic group containing nitrogen atom within ring; Z represents oxygen atom or sulfur atom; and n represents an integer of 0 or 1.

* * * * *

UNITED STATES PATENT AND TRADEMARK OFFICE
CERTIFICATE OF CORRECTION

PATENT NO. : 4,942,106
DATED     : July 17, 1990
INVENTOR(S) : HIDEYUKI TAKAI, ET AL.

It is certified that error appears in the above-identified patent and that said Letters Patent is hereby corrected as shown below:

COLUMN 4

Line 54, "fluorine." should read --fluorine,--.

COLUMN 14

Line 2, "pigment (3))" should read --pigment (3)).--.

COLUMN 15

Line 3, "invention." should read --invention,--.

COLUMN 23

Line 31, "compounds." should read --compounds,--.

Signed and Sealed this

Twenty-fifth Day of February, 1992

Attest:

HARRY F. MANBECK, JR.

*Attesting Officer*   *Commissioner of Patents and Trademarks*